Figure 1:
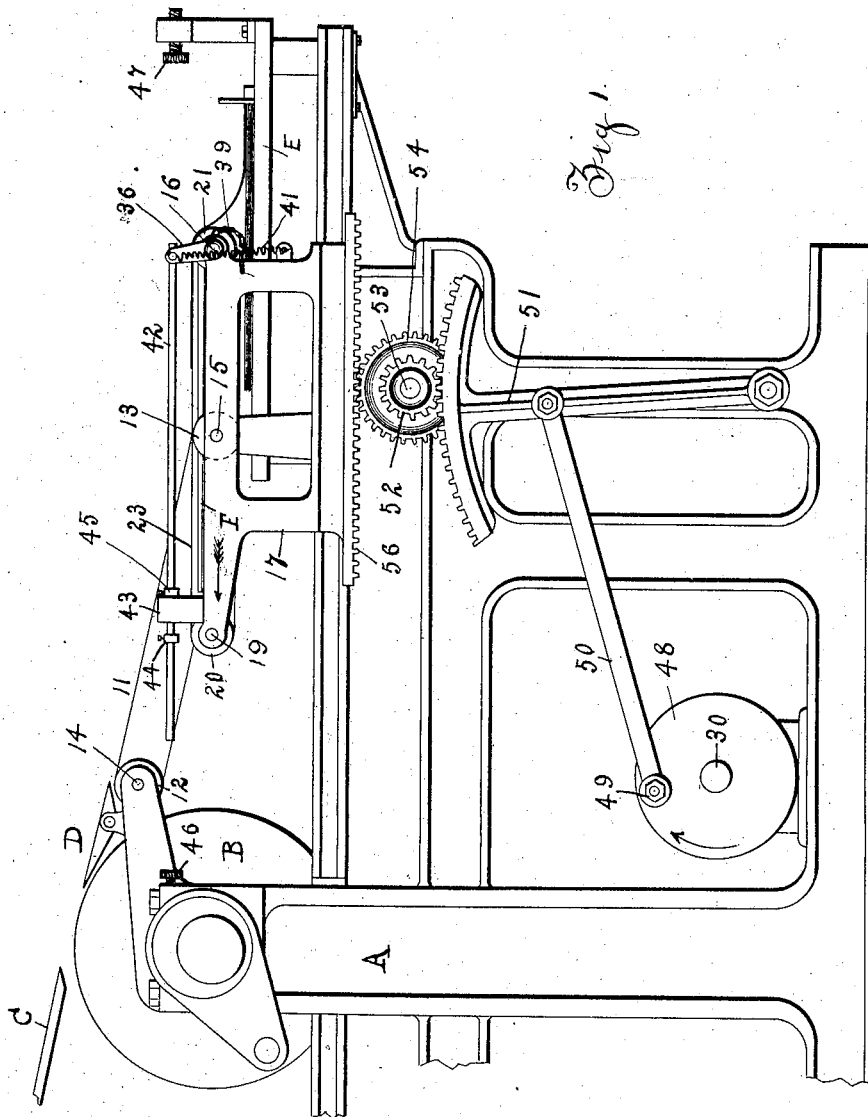

No. 769,124. PATENTED AUG. 30, 1904.
H. A. W. WOOD.
SHEET DELIVERY MECHANISM.
APPLICATION FILED NOV. 25, 1898. RENEWED DEC. 28, 1903.
NO MODEL. 6 SHEETS—SHEET 1.

Witnesses
S. A. Kinsley
H. M. Rugg.

Inventor
H. A. W. Wood
By his Attorneys
Southgate & Southgate

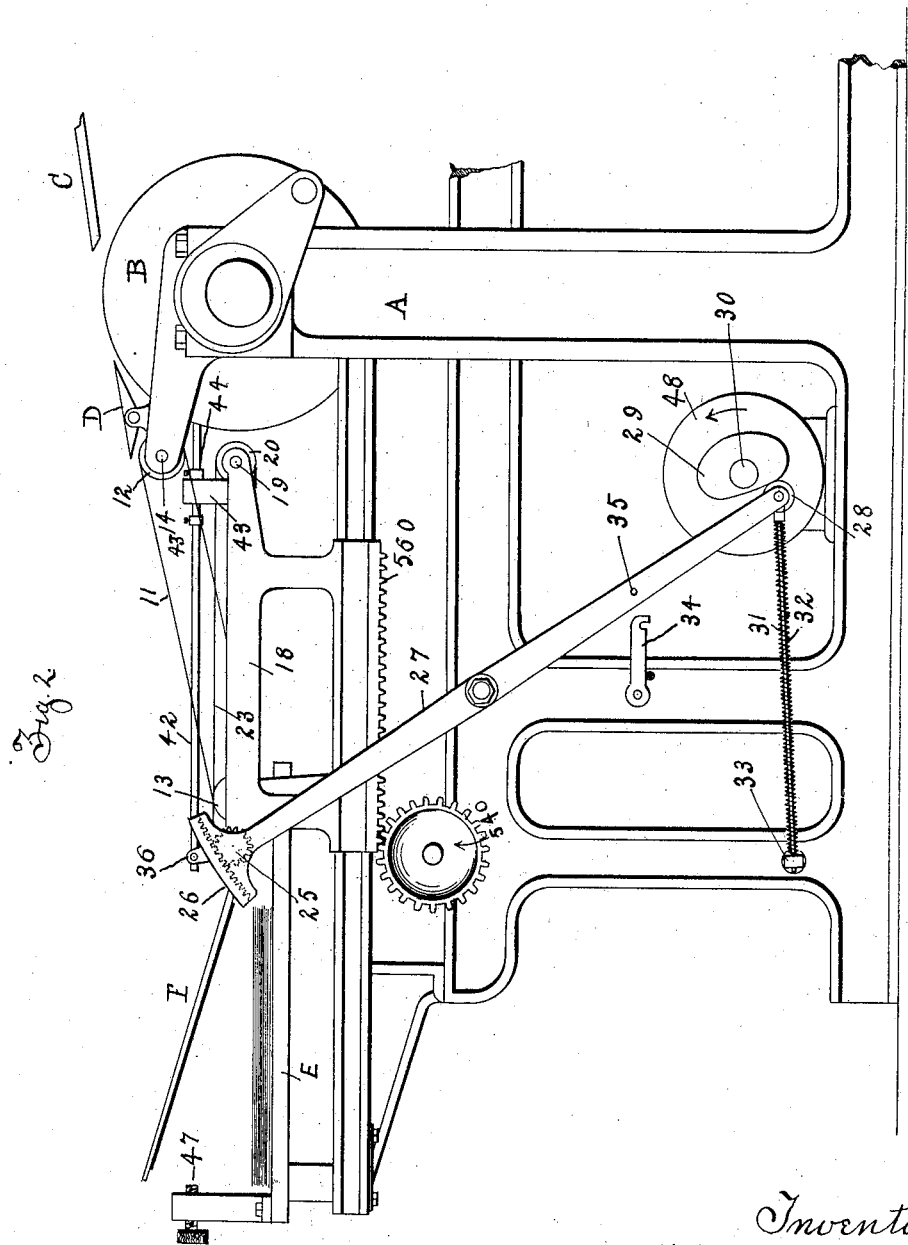

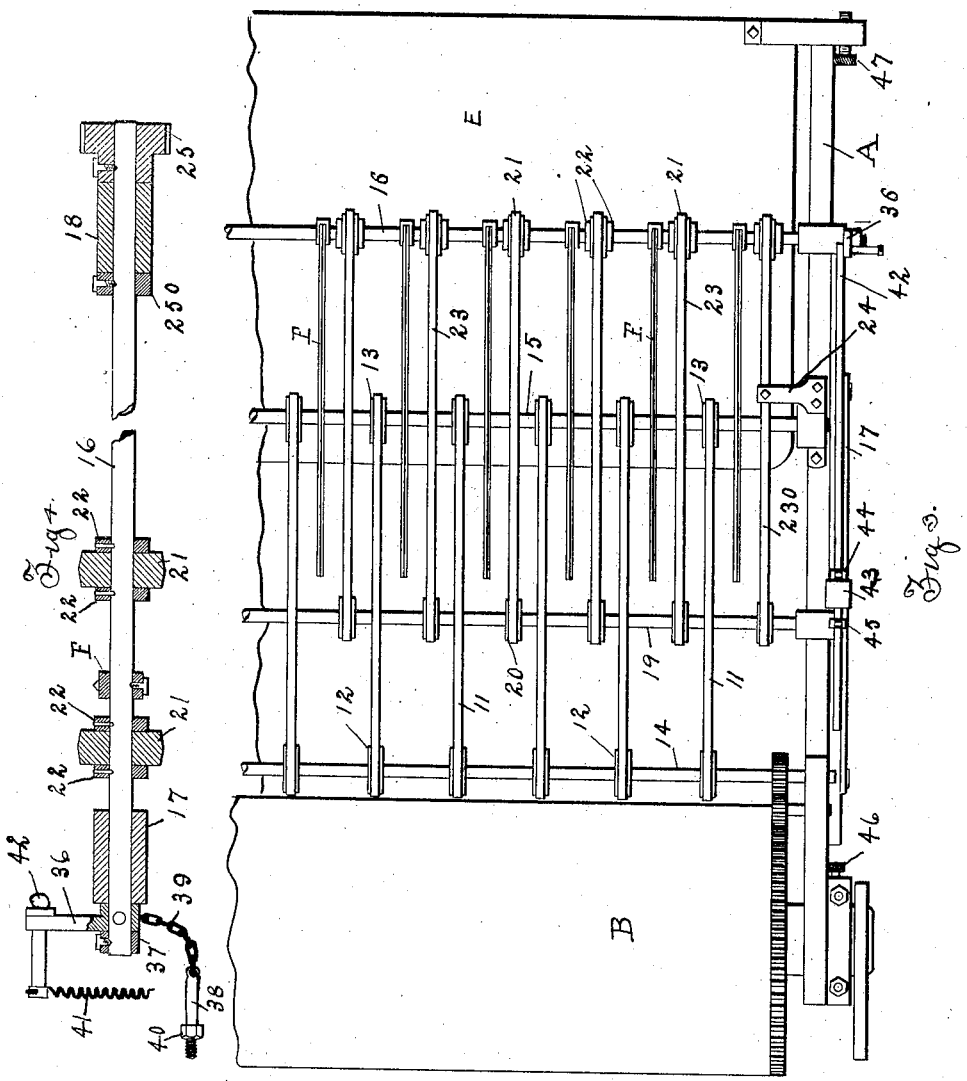

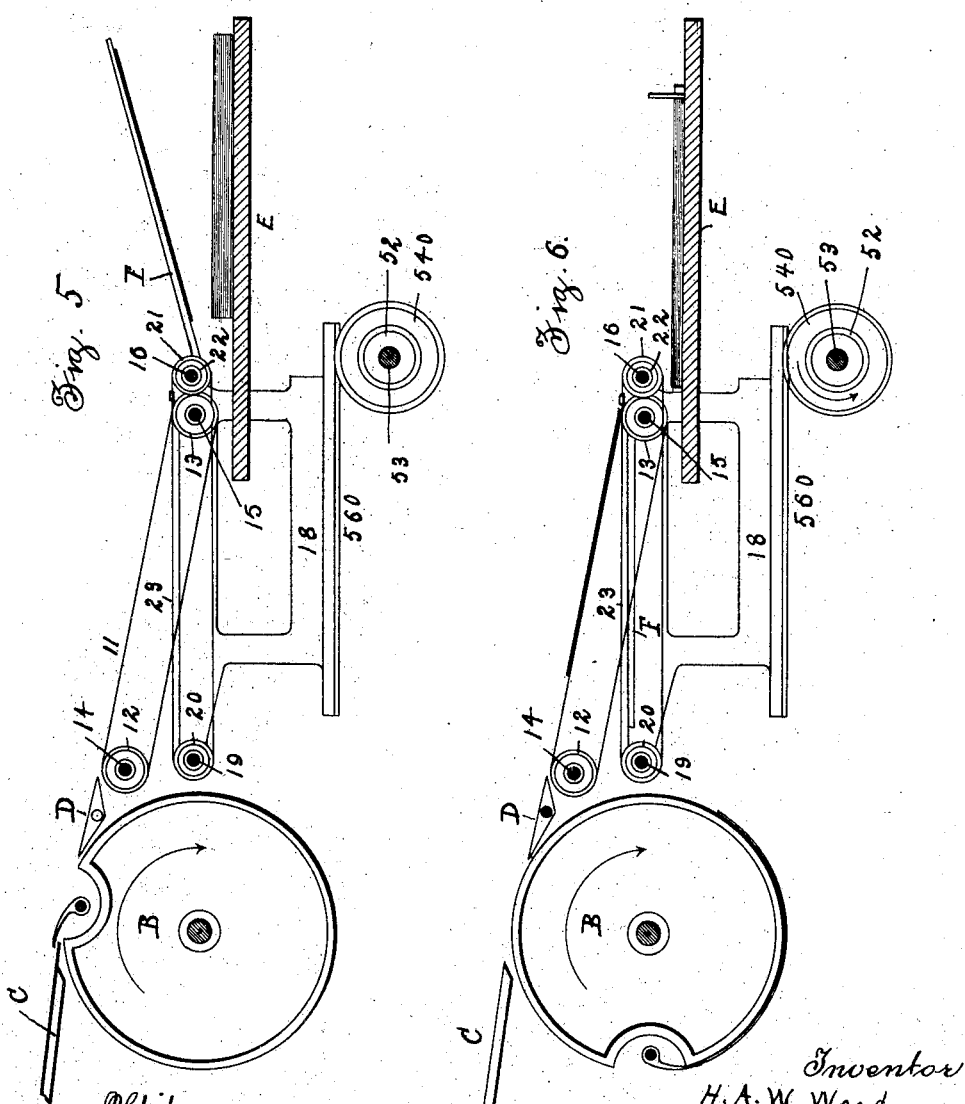

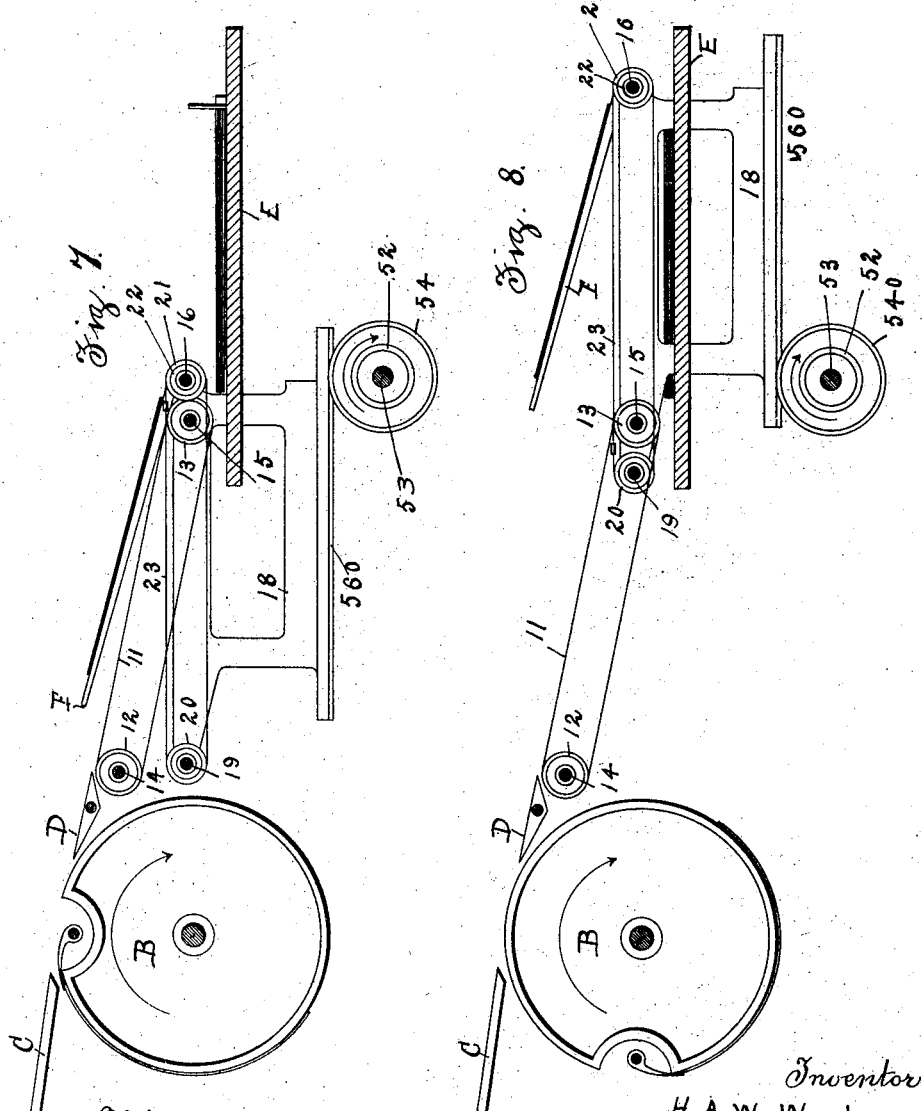

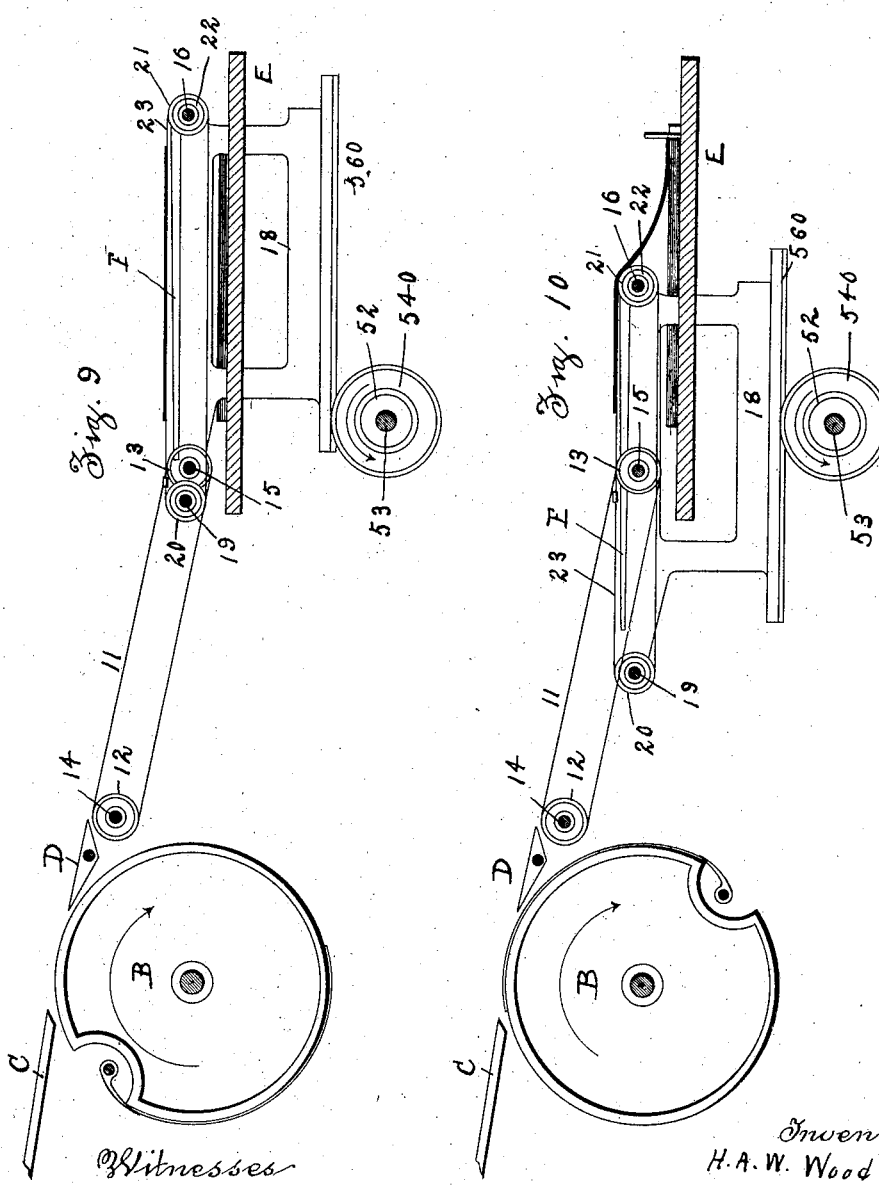

No. 769,124. Patented August 30, 1904.

UNITED STATES PATENT OFFICE.

HENRY A. WISE WOOD, OF NEW YORK, N. Y.

SHEET-DELIVERY MECHANISM.

SPECIFICATION forming part of Letters Patent No. 769,124, dated August 30, 1904.

Application filed November 25, 1898. Renewed December 28, 1903. Serial No. 186,924. (No model.)

*To all whom it may concern:*

Be it known that I, HENRY A. WISE WOOD, a citizen of the United States, residing at New York, in the county of New York and State of New York, have invented a new and useful Sheet-Delivery Mechanism, of which the following is a specification.

The aim of this invention is to provide an improved sheet-delivery especially adapted for use in connection with cylinder printing-presses.

To this end the invention consists of the parts and the combinations of parts hereinafter more particularly described, pointed out in the claims, and shown in the annexed six sheets of drawings, forming part of this application, referring to which and in detail, Figure 1 is a side elevation of enough of a printing-press with my delivery applied thereto to illustrate the operation thereof. Fig. 2 is an elevation from the other side, illustrating how the sheets may be delivered in a different manner. Fig. 3 is a partial plan view. Fig. 4 is a detail, on an enlarged scale, of the fly-shaft; and Figs. 5 to 10, inclusive, are diagrams illustrating the operation.

A sheet-delivery constructed according to my present invention is adapted especially for use in connection with cylinder printing-presses and is especially adapted to be applied to the front of such a machine.

My improved delivery consists of a fly which may be actuated in either of two ways—first, so as to be oscillated to deliver the sheet in the ordinary manner printed side down, or, second, so as to be reciprocated to deliver the sheet printed side up. By this arrangement I can use one delivery—to wit, a fly—and deliver the sheets either side up.

Referring to the drawings and in detail, A designates the framing of the press; B, the impression-cylinder; C, the feed-board; D, the strippers, and E the delivery-table. These parts are arranged in the ordinary manner and need not be described at length. A set of delivery-tapes 11 is arranged to take the sheet from the stripper-fingers in the ordinary manner, this set of tapes being mounted on pulleys 12 and 13, which are secured on shafts 14 and 15, which are journaled in the framing, and the shaft 14 may be driven by the ordinary gearing from the impression-cylinder B, so that the set of tapes will run at the same speed as the movement of the periphery of the impression-cylinder, as is usual.

F represents a suitable fly, consisting of a number of fly-fingers which are rigidly secured on a fly-shaft 16. The fly-shaft is journaled in suitable frames 17 and 18, which are fitted on the main framing A of the press so as to be capable of a sliding movement thereon. Also journaled in the frames 17 and 18 is a shaft 19, which has a number of tape-pulleys 20 secured thereon. Loosely journaled on the fly-shaft 16 are a number of tape-pulleys 21, which are held in place laterally by collars 22, secured to the fly-shaft 16. Tapes 23 pass from the pulleys 20 to 22. The tapes 23 and the fly-fingers are arranged so that they will be disposed between or intermesh with the tapes 11, as shown in Fig. 3. The outermost tape 230 is made of strong material, as leather, and the top thereof is rigidly held by a bracket 24, projecting in from the framing A for a purpose hereinafter described. A pinion 25 is secured on one end of the fly-shaft 16, and a collar 250 is also secured to said shaft 16, the collar and the pinion serving to hold the shaft laterally in place in its bearings. Meshing with this pinion is a segment 26, formed on the end of a vibrating lever 27. This lever carries at its other end a roll 28, which bears on a cam 29, secured upon the usual cam-shaft 30, which makes two turns for each operation of the press. The roll 28 is held in engagement with the cam 29 by a spring 31, which surrounds a rod 32, projecting from the lever 27, and which rod passes through a turnbuckle 33. This constitutes a mechanism for operating the fly so that the same will oscillate. This mechanism may be thrown out of operation by pulling the lower end of the lever 27 against the spring 31 and turning catch 34 to engage a stud 35 on the lever, as shown in Fig. 2. Loosely mounted on the other end of the fly-shaft 16 relatively to the pinion 25 is a lever 36, which is held in place by a collar 37, secured on the end of the shaft 16. A suitable taper key is connected by a chain 39 to the lever 36 and may be inserted into a hole in the lever 36, so as to pin the same to the shaft 16, and the pin may be kept in place by means of a nut 40, threaded on the end thereof. A spring 41 is arranged between a stud projecting from the end of the lever and a pin on the frame 17 and is so centered that if the lever 36 is thrown either side of its upright position the spring will hold the same in the position into which it is last moved. A rod 42 is connected to the end of the lever 36 and is carried through a bracket 43, projecting up from the frame 17, and is provided with suitable collars 44 and 45, which may be used to limit the motion of the lever 36 either side of its upright position. A screw 46 is tapped into the framing that goes up to support the cylinder, and a screw 47 is tapped into a bracket projecting up from the delivery-table E. These screws are so arranged as to be in the horizontal line of the rod 42.

To reciprocate the fly back and forth, the end of the shaft 30 is provided with a disk 48, secured on which is a crank-pin 49, which connects by a pitman 50 to a pivoted segment 51, which segment gears with a pinion 52, mounted upon a shaft 53, which carries a gear 54, meshing with a rack 55, formed or fastened to the frame 17. The shaft 53 may be carried through the press and have a gear 540 mounted on the other end thereof, which may mesh with a rack 560, secured to the frame 18.

The operation with this improved delivery is as follows: If it is desired to use the fly F as an oscillating fly to fly the sheets in the ordinary manner, the pitman 50 is disconnected from the crank-pin 49 and the frames 17 and 18 are left in position nearest the impression-cylinder B, as shown in Figs. 2 and 5. The taper pin or key 38 is withdrawn from the lever 36, and the catch 34 is released, so that the segment 26 on the lever 27 will engage the pinion 25 on the shaft 16, so that said lever can vibrate to oscillate the fly F. With this arrangement the sheet after being stripped from the impression-cylinder B by the stripper-fingers D is carried down by the tapes 11 over the fly F, which is oscillated at the proper time to deliver the sheets printed side down upon the delivery-table E.

If it is desired to deliver the sheets by the fly printed side up, the following adjustments are made: The taper key or pin 38 is inserted in the lever 36, thus tying the same to the fly-shaft 16. The pivoted lever 27 is moved so that the segment 26 will disengage from the pinion 25 and is held in its inoperative position by means of the catch 34. The pitman 50 is secured to the crank-pin 49. The operation will then be as follows: As the sheet passes down on the top of tapes 11 the fly will have just about completed its reciprocation to the left, as shown in Fig. 6. The rod 42 will then strike on the screw 46, and the lever 36 will be thrown to its right-hand position and the fly raised, as shown in Fig. 7, to pick the sheet off of the tapes 11. The fly will then be carried forward by the gearing before described to substantially the position shown in Fig. 8, when the rod 42 will strike the screw 47 and the lever 36 will be thrown to its left-hand position and the fly will be depressed down below the tapes 23, as shown in Fig. 9. The fly will now be moved to the left, and as the top of the tapes 23 are held stationary by the tape 230, which is secured to a stationary part, as before described, as the fly moves toward the impression-cylinder, the tapes 23 will peel from under the sheet, and the fly will also be withdrawn from under the sheet, which will be deposited printed side up on the delivery-table E. This latter operation will give a very accurate, smoothly-running, printed-side-up delivery. The arrangements thus described are very simple and of few parts. This printed-side-up delivery may be used by itself where a mechanism is only desired which shall deliver the sheets printed side up.

The tapes 11, which carry the sheet out over the fly, constitute a means for propelling the sheet to that position, and the tapes 23 constitute a "final delivery" mechanism, as I have used these terms in the claims.

The details and arrangements herein described may be greatly varied by a skilled printing-press builder without departing from the scope of my invention as expressed in the claims.

Having thus fully described my invention, what I claim, and desire to secure by Letters Patent, is—

1. A fly-delivery combined with mechanism whereby the same may be oscillated or reciprocated so that sheets may be delivered by said fly either side up.

2. The combination with a cylinder printing-press of a fly-delivery, mechanism for oscillating said fly, and means for reciprocating said fly, said mechanisms being so arranged that said fly may be used to deliver the sheets either side up.

3. The combination in a cylinder printing-press of a fly-delivery arranged in front of the impression-cylinder thereof, mechanism for oscillating said fly so that the same will act to deliver the sheets printed side down, and mechanism for reciprocating said fly so that the same will act to deliver the sheets printed side up, said mechanisms being so arranged that the fly may be used in either way.

4. The combination of a set of tapes, a fly arranged to take the sheet from said set of tapes, mechanism for oscillating said fly and mechanism for reciprocating said fly, said mechanisms being so arranged that either may be used so that said fly is adapted to take the sheets from said tapes and deliver the same either side up.

5. The combination in a cylinder printing-press of the impression-cylinder, a set of tapes extending from the impression-cylinder, a delivery-table, a fly, mechanism for oscillating the fly so that the fly will take the sheets from said tapes and deliver the same on the delivery-table printed side down, and mechanism for reciprocating said fly so that the fly will take the sheets from said tapes and deliver the same on said table printed side up, said mechanisms being so arranged that the sheets may be delivered in either way.

6. The combination of an impression-cylinder, a set of delivery-tapes, a fly, mechanism for reciprocating the fly, and mechanism for partially raising said fly as it reaches its limit of movement nearest the impression-cylinder, and for lowering said fly as it reaches its limit of movement farthest away from said impression-cylinder.

7. The combination of an impression-cylinder, a set of delivery-tapes, a pivoted fly, mechanism for reciprocating said fly to deliver the sheets from said tapes, and mechanism for partially oscillating the fly as it reaches its limit of movement nearest the impression-cylinder, and for returning the same to its lowest position as it reaches its limit of movement farthest away from the impression-cylinder.

8. The combination with a fly, mechanism for reciprocating the fly, a set of tapes reciprocating with the fly, and mechanism for slightly raising the fly so that said fly will act to carry a sheet forward and will then deposit the same upon said tapes.

9. The combination with a fly, mechanism for reciprocating the fly, a set of tapes moving with the fly, means for holding the top surface of the tapes stationary, and means for slightly raising said fly so that the fly will carry the sheet forward and will then drop to deposit the sheet on the tapes so that the said tapes will thereafter peel from under the sheet.

10. The combination with a set of delivery-tapes, a fly meshing therewith, mechanism for reciprocating the fly, a second set of tapes intermeshing with said delivery-tapes and reciprocating with the fly, and mechanism for slightly raising said fly so that the same will in one extreme pick the sheet from off the delivery-tapes, and in the other extreme deposit the same upon the second set of tapes.

11. The combination of a fly-shaft, a number of fly-fingers rigidly mounted thereon, tape-pulleys loosely mounted on said fly-shaft, a set of tapes passing around said tape-pulleys, mechanism for reciprocating said fly and tapes, and mechanism for slightly oscillating said fly-shaft.

12. The combination of a fly-shaft, a set of fly-fingers rigidly secured thereon, a number of tape-pulleys loosely mounted on said fly-shaft, a set of tapes passing around said tape-pulleys, mechanism for reciprocating said parts, stops, and operative connections to said fly-shaft, arranged so that the same will constitute a mechanism for slightly oscillating said shaft as the same is reciprocated.

13. The combination of a fly-shaft, a number of fly-fingers rigidly secured thereto, mechanism for reciprocating and slightly oscillating said fly-shaft, and mechanism for imparting a large oscillation to said fly-shaft without reciprocating the same, whereby said fly may be used as an oscillating or as a reciprocating fly.

14. The combination of a fly, mechanism for reciprocating the same and mechanism for slightly oscillating the same, consisting of a lever mounted on the fly-shaft, a rod extending from said lever, and stationary stops.

15. The combination of a fly, mechanism for reciprocating the same and mechanism for slightly oscillating the same consisting of a lever mounted on the fly-shaft, stops, and a spring connected to said lever for holding the fly in its different positions.

16. The combination of a fly, mechanism for reciprocating the same, a lever mounted on the fly-shaft, a rod extending from said lever, stops for engaging said rod, and collars arranged on said rod.

17. The combination of a fly, mechanism for reciprocating the same, a lever arranged on the fly-shaft, a rod extending therefrom, stops for engaging said rod, collars on said rod for limiting the motion thereof, and a spring connected to said lever.

18. The combination of a fly-shaft, a number of fly-fingers rigidly mounted thereon, mechanism for reciprocating said shaft, a lever mounted on said shaft, means for vibrating the lever as the fly-shaft reciprocates, means whereby said lever may be secured to the fly-shaft, a pinion secured on said fly-shaft, and oscillating mechanism for engagement with said pinion, the parts being so arranged that when the fly-shaft is reciprocated the lever may be rigidly connected thereto, and so that when the fly-shaft is not reciprocated, said lever may be left loose on said shaft and said shaft operated through said pinion.

19. The combination of two sets of tape-pulleys, one set being rigidly mounted upon a shaft, a set of tapes, mechanism for reciprocating the same, and means extending from a stationary part of the machine to one of said tapes, whereby, as the same are reciprocated, their top surface will remain stationary.

20. The combination of a fly-shaft, a set of fly-fingers secured thereto, a number of tape-pulleys loosely mounted thereon, a set of tapes passing around said tape-pulleys, a shaft carrying another set of tape-pulleys for said tapes, mechanism for reciprocating these parts, and means extending from a stationary part for grasping one of said tapes.

21. In a delivery mechanism for a printing-press, a fly, means for propelling a sheet over said fly, means for moving said fly with the sheet resting on the same, and a final delivery mechanism on which the fly delivers the sheet adapted to deposit the sheet face up upon a receiving-table.

22. In a delivery mechanism for a printing-press, a fly, means for propelling a sheet over said fly, means for lifting said fly to take the sheet from the propelling means, means for moving said fly with the sheet resting on the same, a final delivery mechanism, and means for lowering the fly to deposit the sheet upon the final delivery mechanism.

23. In a delivery mechanism for a printing-press, a fly, means for propelling a sheet over said fly, means for raising said fly so that the sheet will be lifted by the same, means for moving said fly so that the same will be moved with the sheet resting on the same in an inclined position, a final delivery mechanism adapted to deposit the sheet face up on a receiving-table, and means for operating said fly to deposit the sheet upon said final delivery mechanism.

24. In a delivery mechanism, the combination of a shaft carrying a number of fly-fingers, a pinion mounted on said shaft, a cam-actuated vibrating segment engaging said pinion, and means for holding said segment out of engagement with said pinion.

25. The combination in a delivery mechanism, of a carriage, mechanism for reciprocating the same, connections in said reciprocating mechanism so that the machine can be operated without reciprocating the carriage, a shaft journaled in said carriage carrying a number of fly-fingers, a pinion on said shaft, a cam-actuated vibrating segment for oscillating said shaft, means for holding said segment out of mesh with said pinion, and means for slightly oscillating said shaft when the carriage is reciprocated, whereby said fly-fingers may be used to deliver the sheets either printed side up or printed side down.

In testimony whereof I have hereunto set my hand in the presence of two subscribing witnesses.

H. A. WISE WOOD.

Witnesses:
ROBT. J. McMAHON,
ANNIE B. WALTERS.